Oct. 29, 1968 A. MAGG 3,407,676
MULTIPLE SPEED GEARSHIFT CONTROL FOR MOTOR VEHICLES
Filed Sept. 20, 1966
Fig.1
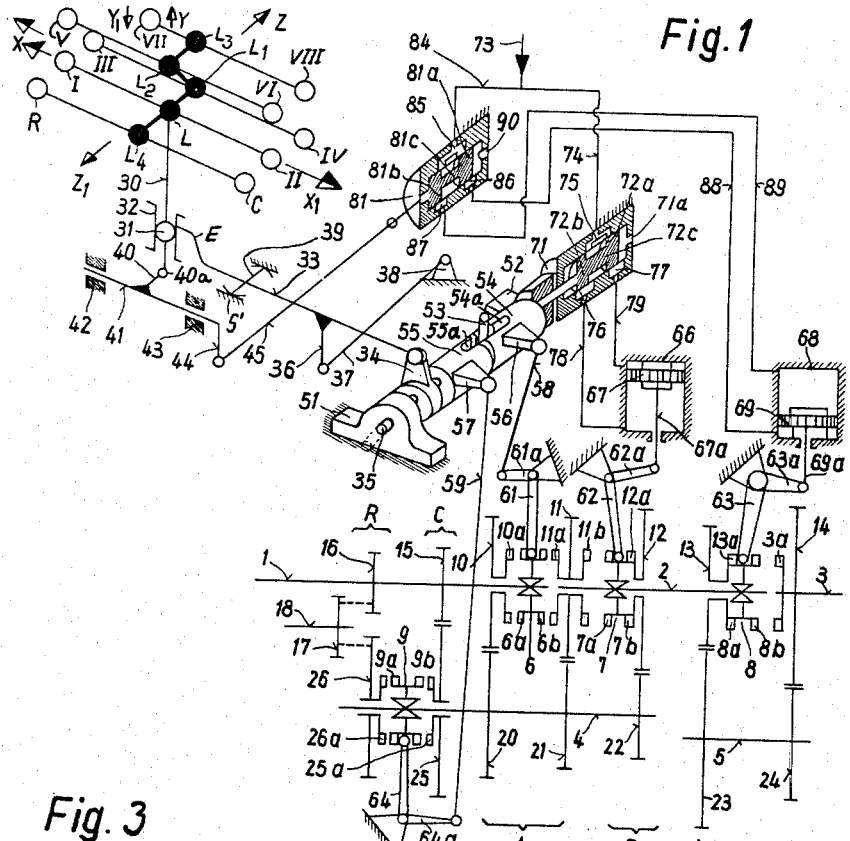
Fig.3
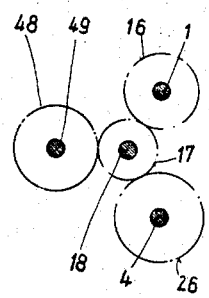
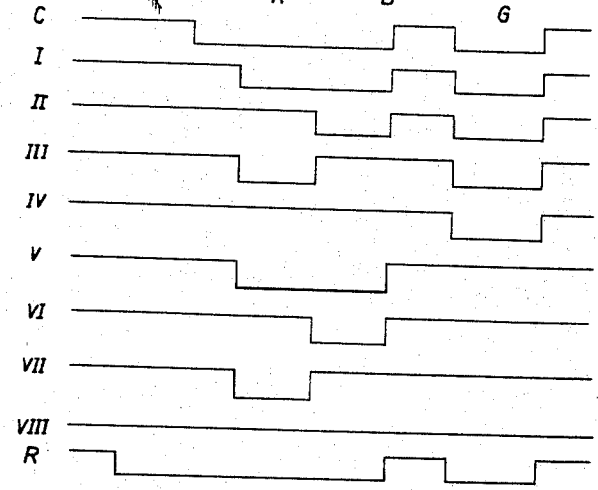
Fig.2
Inventor:
ALFRED MAGG
by Albert M Zalkind United States Patent Office 3,407,676
Patented Oct. 29, 1968

3,407,676
MULTIPLE SPEED GEARSHIFT CONTROL
FOR MOTOR VEHICLES
Alfred Magg, Friedrichshafen, Germany, assignor to
Zahnradfabrik Friedrichshafen A.G., Friedrichshafen, Germany
Filed Sept. 20, 1966, Ser. No. 581,671
9 Claims. (Cl. 74—335)

ABSTRACT OF THE DISCLOSURE

This invention relates to gear transmission and more particularly to transmissions having a large number of speeds, for example, eight speeds, a crawl speed and a reverse speed, for heavy commercial vehicles, such as trucks and the like. A combination of components is provided involving a plurality of gear ratios any one of which can be connected to an auxiliary step-down gear device so that a large plurality of speeds are selective by means of a gearshift lever having movement in a pair of selective planes.

One of the difficulties with prior art transmissions is the complexity of the control mechanism to effect shifting and the need for special training of drivers to become familiar with a complex series of manual shift lever motions in going through speed change.

Accordingly, the present invention has for an object a simplified transmission mechanism utilizing conventional spur gearing with a manual shift control mechanism for effecting speed changes by manual motions utilizing the familiar H pattern shift lever movement.

Other objects and features of the invention will be apparent from the description which follows:

Briefly, the invention contemplates the combined use of manual and pneumatic force to effect actuation of clutch dogs which are moved in predetermined relation with respect to each other in order to achieve gear combinations which will yield a large number of speeds essential to heavy vehicle operation, and in addition a special so-called "crawl speed" as well as reverse speeds.

The particular features of the invention reside in combining a main transmission having three pairs of spur gears with an auxiliary transmission having a single step-down ratio. Torque can be directed through such step-down ratio of auxiliary gearing for each of several selective lower speeds of the main transmission or direct drive can be utilized by passing the auxiliary gearing for high speeds.

In addition, a reverse speed gearing and a crawl speed gearing is associated with the main transmission and placed upstream thereof on the engine drive shaft for compactness, simplicity and ease of control.

The arrangement is such that manual control is effected via a gearshift lever which can be rocked in either of two horizontal planes in an H pattern in each plane. Such lever can be lifted by the operator from the lower to the upper plane for H pattern motion in either plane wherein the first four speeds, as well as reverse and crawl speeds, are effected by rocking of the lever in the lower plane and four additional and higher speeds are controlled by the operator raising the lever so as to rock it in an H pattern in the upper plane.

The control mechanism makes use of simple rod and lever components which are moved by the manual force applied to the gearshift lever to actuate valves to control pressure to pressure medium cylinders that effect certain shifting functions depending upon gear combinations utilized at respective speeds. Thus, for various gear ratio combinations, certain gears are engaged (or disengaged) by manual force and others by pressure medium force.

Another object of the present invention is to provide a transmission especially for heavy commercial automotive vehicles which provides a plurality of torque and speed ratios and which can be changed easily and without error by the combined use of manual and pressure medium force. Since usually heavy commercial vehicles have a air pressure system for operating the brake of vehicle, a simple and relatively inexpensive design results from using compressed air for pressure medium force.

A detailed description of the invention now follows in conjunction with the drawing in which:

FIG. 1 is a perspective showing in generally symbolic presentation the combination of elements which effect the invention, the neutral condition of the transmission being shown;

FIG. 2 is a flow shart of power at the several speeds, which figure is drawn directly below FIG. 1 so that it will be apparent which gears are in power transmitting operation at any particular speed; and FIG. 3 is an elevation end view showing relative positions of the various gear-carrying shafts of the invention with a power take off.

Referring to FIG. 1 the arrangement presented utilizes and engine drive shaft 1, an intermediate shaft 2, and an output shaft 3, these shafts being coaxial and independent of each other.

Freely rotative on shaft 1 is a gear 10 in constant mesh with respective gear 20 which is keyed on a countershaft 4. The gear group A just described has also a gear 11 freely rotative on intermediate shaft 2 and in constant mesh with a gear 21 keyed to countershaft 4. An additional gear group B comprises the gear 12 freely rotative on intermediate shaft 2 and in constant mesh with a gear 22 keyed to countershaft 4. The groups A and B constitute the main gear transmission. The auxiliary transmission group G comprises a gear 13 freely rotative on intermediate shaft 2 and in constant mesh with a gear 23 keyed to countershaft 5 to which is also keyed a gear 24 in constant mesh with gear 14 keyed on output shaft 3.

The reverse group R comprises a gear 16 keyed on drive shaft 1 and an idler gear 17 carried on idler shaft 18, which gear 17 meshes with gear 16 and with a gear 26 freely rotative on countershaft 4. The crawl speed gearing C comprises a gear 15 keyed to drive shaft 1 and in constant mesh with a gear 25 freely rotative on countershaft 4. Gear 48 and shaft 49 is a power take-off from idler 17.

In order to effect various gear combinations slidable dog clutches 6, 7, 8, 9 are utilized. Thus, on drive shaft 1, the slidable dog clutch 6, which will be understood to be splined to the shaft, can shift left or right by actuation of a shift lever 61, which forms a bell crank with lever 61a, so as to mesh clutch teeth 6a with teeth 10a of gear 10 or clutch teeth 6b with teeth 11a of gear 11 in a well understood manner. Similarly, clutch 7 actuatable by shift lever 62 which forms a bell crank with lever 62a, is slidably splined on intermediate shaft 2 and can shift to the left so that clutch teeth 7a engage teeth 11b carried by gear 11 or clutch teeth 7b can engage teeth 12a of gear 12. Likewise, clutch 8 slidably splined on shaft 2 can be shifted by shift lever 63 which forms a bell crank with lever 63a, to engage clutch teeth 8a with the teeth 13a of gear 13, or to engage clutch teeth 8b with teeth 3a of gear 14. Similarly, clutch 9 is slidably splined on countershaft 4 and operably by shift lever 64, which forms a bell crank with lever 64a, to engage clutch teeth 9a with teeth 26a of gear 26 or clutch teeth 9b with teeth 25a of gear 25.

The dog clutches may have synchronizing rings if desired. For simplicity and compactness of transmission and control mechanism the reverse and crawl gearing, R and C, respectively, are located upstream of the main gear transmission groups A and B and powered directly from drive shaft 1.

Reference is made to FIG. 2 at this time to show the power flow for all of the speeds achieved by the transmission, which chart is in conventional form and will be readily understood by persons skilled in the art without further explanation.

Referring to the manual control arrangement, a shift lever 30 having a ball 31 slidable in a collar 32 is carried by a lever 40 with which the lower end of the shift lever is connected by a universal joint 40a. Said collar 32 is carried by being securely fixed to a rod 33 having the offset crank arm E between the major portion of the rod and collar 32 to which it is affixed. Since lever 30 is slidable in collar 32 the ball handle which may be represented as L (indicating neutral position) can be rocked in a lower plane to positions L1 and L4, or in an upper plane, by raising lever 30, so as to be rockable to positions L2 and L3 in the upper plane.

The lever 40 is keyed to a rotative shaft 41 and rotatively carried in fixed guide sleeves 42 and 43. Shaft 41 has an offset arm 44 pivotally joined to a rod 45 for actuation of a valve spool in valve 81 as hereinafter described.

Keyed to rod 33 is a guide arm 36 pivotally joined to a guide rod 37, the other end of which is pivotally secured to a fixed member 38. Rod 33 has a pivotal connection with a lever 34 for reciprocation and rotation of a shaft 35 for a purpose hereinafter described, carried in bearings 51, 52.

A guiding slide arrangement for rod 33 is effected by a collar bearing 39 which is integrally with rod 33 and which can rotate or slide in a suitable bearing support S fixed in the transmission housing.

The dog clutches 7 and 8 are actuated via respective shifting forks 62 and 63 as described, which forks are actuated by respective fluid pressure cylinders 66 and 68 having respective pistons 67 and 69 and respective piston rods 67a and 69a connected to respective shifting forks via bell crank arrangements as shown. These are double-ended pneumatic pressure cylinders of conventional construction wherein cylinder 66 is fed via conduits 78 and 79 and cylinder 68 is fed via conduits 88 and 89, both pressure and exhaust being conducted through such conduits. Conduits 78 and 79 connect to a conventional multiway spool valve 71 having spool pistons 72a and 72b connected by the narrowed portion 72c whence pressure fluid can be reversibly controlled via internal annular channels 76 and 77 to respective conduits 78 and 79. Pressure fluid is fed to the valve housing central channel 75 via conduit 74 which connects with a source 73 of pneumatic pressure and exhaust occurs through apertures (one shown) at the ends of the valve housing, such as aperture 71a.

The same source 73 feeds via conduit 84 to the central channel 85 of the conventional multiway spool valve 81 having spool pistons 81a and 81b connected by an intermediate narrowed portion 81c for controlling fluid pressure from channels 86 and 87 via the lines 88 and 89, respectively, to the respective ends of the conventional double-ended cylinder 68. Exhaust is via end ports (one shown) of the valve housing, e.g., port 90 of valve 81. Assuming the reference character L represents the ball handle position of lever 30 in neutral, such handle can be swung in the lower plane to the positions L1 or L4 from the initial central position L and those positions represent idling positions for purposes of selecting speeds I, II, III and IV, or reverse or crawl speeds. Thus, in the lower plane at position L, movement in the direction X effects speed I and in the direction X1 effects speed II. At the position L1 speed III or speed IV can be achieved and at the position L4 reverse or crawl speed can be selected. It will be noted that the motion of the lever is an H pattern for the first four speeds, with an additional reversible rocking path in the lower plane for reverse and crawl speeds.

It should be noted that when lever 30 is in the lower position the valve 81 cannot be operated due to the perpendicular relationship with lever 40, although motion in the direction Z or Z1 is not restrained, for lever 30.

In order to select speeds V, VI, VII and VIII, the lever is swung from speed IV to the idle position at L1 and then pulled upwardly in direction Y in a slanting path to the position L2 from which position it is operative to rock in the upper plane in the direction X for speed V or the direction X1 for speed VI. Subsequent to speed XI, lever 30 is brought back to the idling position L2 and rocked in the direction Z to position L3 and then rocked in the direction X for speed VII and thence in the direction X1 for speed VIII. In order to bring the transmission back to neutral, that is position L, it is only necessary to move lever 30 back to position L3 and thence to L2 and press it down to L.

The shaft 35 is reciprocated via shift lever 30 (in either the upper or lower position), ball 31, collar 32, and rod 33 by swinging lever 30 in the direction Z or Z1. Shaft 35 follows the direction Z or Z1 to control valve 71. Rotation of shaft 35 is effected by swinging lever 30 in the direction X or X1, in either plane of operation.

Valve 81 is controlled via the rod 45 by pulling up or pushing down lever 30 in the direction Y or Y1, transmission of force being via lever 40 and rotation of shaft 41 provided lever 30 is in raised position, otherwise shaft 41 cannot be rotated. However, always slidably reciprocal movement of rod 33 is permitted and it will be noted that rod 45 is pivotally connected to the valve spool. Thus, cylinder 68 is controlled to actuate the dog clutch 8.

Carried relatively rotatively with respect thereto but axially immovable on shaft 35 is a sleeve 54 having a finger 56 pivotally connected via link 58 with shift fork 61 to reversibly shift dog clutch 6 for engaging gear 10 or 11 with the input shaft 1. Also carried relatively rotatively but axially immovable on shaft 35 is the collar 55 having finger 57 pivotally connected with link 59 for reversibly shifting the dog clutch 9 via shift fork 64 to connect gear 26 or gear 25 with countershaft 4.

It will be noted that collars 54 and 55 have a pair of respective slots 54a and 55a which are aligned when shift lever 30 is in any position L, L1, L2, L3 or L4, all in the same plane. Thus, axial shifting of shaft 35 causes the pin 53 to move into the slot of either of the collars whereby it keys to a selected collar for reversible rotation thereof upon rotation of shaft 35.

It will thus be apparent that selection of operation of dog clutches 6 or 9 is effected by the axial position of pin 53 responsive to shifting of shaft 35, and selection of a gear 10, 11, 25, 26 to be connected to its respective shaft 1, 2, 4, as well as effecting such connection, is subsequently effected by rotation of shaft 35 depending upon direction of rotation.

The valve spool of valve 71 is reciprocated by means of the shaft 35 to which it connects.

Rod 33 is pivotally secured to the lever 34 in turn fixedly secured to shaft 35 so that thrust of rod 33 will rotate shaft 35 and horizontal rocking of rod 33, guided by members 36 and 37 will reciprocate shaft 35.

Thus, cylinder 66 is controlled via valve 71 for shifting the dog clutch 7 when shift lever 30 is rocked in the Z or Z1 directions, and dog clutches 6, 9 are manually actuated, selectively, when shift lever 30 is rocked in the X–X1 directions. Finally, dog clutch 8 is selectively actuated (via valve 81 and cylinder 68) when shift lever 30 is in the upper plane only and rocked in the Z–Z1 directions.

As shown in FIG. 1, the transmission is in neutral and ready to be placed in first speed. The valve 71 is initially in such position that pressure fluid follows conduit 74, channel 75, channel 76, conduit 78 to the bottom of cylinder 67; piston 67 is raised and thus gear 12 is engaged with intermediate shaft 2. The top of cylinder 66 is connected via valve 71 to the open exhaust port 71a. Also, piston 69 is effecting engagement of gear 13 with shaft 2 since pressure is connected to the top of cylinder 68 via line 89, channel 87, line 84, the valve spool of valve 81 being in the position noted. If shift lever 30 is now rocked from L to position L1, rod 33 rocks lever 34, shaft 35, pin 53, collar 54, lever 56 to pull link 58 thus rocking shifting fork 61 to shift clutch 6 thus engaging gear 10 with input shaft 1. Power flows via 1–10–20–4–22–12–2–13–23–5–24–14–3 to the vehicle wheels (not shown).

To shift to speed II, lever 30 is brought back through neutral and thence to position II wherein the positions of pistons 67 and 69 remain as shown, but clutch 6 has been shifted so that gear 11 now engages with shaft 1. Power flow then follows as above except that gears 11 and 21 are utilized in place of gears 10 and 20 in gear group A, but gear group B remains unchanged. The power flow is then 1–11–21–4–22–12–2–13–23–5–24–14–3.

In order to shift into third speed shift lever 30 is swung from position II to neutral position L thence to L1, thence to position III. In moving the shift lever to position L1 the shaft 35 is reciprocated in the Z direction by virtue of the support of members 36 and 37 when rod 33 is rotated by collar 32. Accordingly, pin 53 will move further into slot 54a and the spool of valve 71 will be actuated by shaft 35 to exhaust cylinder 66 below piston 67 to conduct compressed air above piston 67 thereby actuating shift fork 62 to actuate clutch 7 to connect gear 11 with intermediate shaft 2. In the motion of shift lever 30 from position L1 to position III, sleeve 54 is rotated counterclockwise by pin 53 so that shift fork 61 disengages gear 11 from shaft 1 and engages gear 10 to shaft 1. Thus, the gear group A is once more utilized although the gear group B drops out and the auxiliary gear group G remains in the position shown in FIG. 1 for torque transmission to output shaft 3. Power flow is 1–10–20–4–21–11–2–13–23–5–24–14–3.

For fourth speed only the auxiliary transmission G is utilized and this is accomplished by swinging shift lever 30 from position III to position IV which actuates shift fork 61 so that dog clutch 6 effects connection of gear 11 with drive shaft 1. Inasmuch as dog clutch 7 remains in the same position as it had in third speed, namely, connecting gear 11 to intermediate shaft 2, power flow takes place directly through gear 11 to the intermediate shaft 2 and thence to the auxiliary transmission G and output shaft 3.

Thus, for fifth speed, shift lever 30 is bodily lifted to the upper plane, which rotates shaft 41 to reverse valve 81 and piston 69 moves upwardly to engage clutch 8 with gear 14 providing direct drive from shaft 2 to shaft 3, bypassing the reduction gearing of group G. Valve 71 is also reversed by pulling lever 30 to the upper plane, piston 67 moving to effect actuation of clutch 7 to disengage gear 11 from shaft 2 and to engage gear 12 therewith. Lever 30 is then rocked to position V effecting manual force actuation of clutch 6 since pin 53 is still in slot 54a whereby the rocking motion of the lever rotates sleeve 54 counterclockwise to pull rod 58 for the actuation of clutch 6. Gear 10 is accordingly connected to shaft 1. The power flow is then 1–10–20–4–22–12–2–3.

For sixth speed, lever 30 through position L2 is rocked to position VI, the valves remaining unshifted, and sleeve 54 rotated clockwise whence gear 11 is connected to shaft 1, the power flow being the same as fifth speed except for substitution of gear pair 11/21 for 10/20.

For seventh speed, lever 30 is moved back to L2 thence to L3. This does not affect cylinder 68, but it shifts valve 71 to reverse piston 67 in cylinder 66, which piston moves down to engage gear 11 with shaft 2. Lever 30 is then moved to position VII causing sleeve 54 to rotate counterclockwise to engage gear 10 with shaft 1. Power flow is 1–10–20–4–21–11–2–3.

As to eighth speed, lever 30 is swung to position VIII, reversing the position of sleeve 54 to engage gear 11 with shaft 1, effecting direct drive via shafts 1, 2, 3.

For effecting reverse speed, shift lever 30, starting at idling position L, is swung to position L4 which effects rotation of rod 33 whence shaft 35 is reciprocated in the direction Z1 so that pin 53 moves out of slot 54a into slot 55a. Subsequent movement of the shift lever to position R rotates sleeve 55 counterclockwise via pin 53 whence lever 57 actuates shift fork 64 via rod 59 moving upwardly so that dog clutch 9 effects engagement of gear 26 with countershaft 4. Accordingly, power flow takes place from drive shaft 1 to gear 16 which meshes with idler gear 17 and thence to gear 26, which rotates countershaft 4 in a reverse direction effecting reversal of output shaft 3 via gear groups B and G.

Transmission of torque takes place through gear group B and auxiliary transmission G inasmuch as the initial condition of sleeve 54 and cylinder 69 are as shown in FIG. 1 so that no drive takes place through gear group A at this time.

For crawl speed the shift lever is moved from position L to position L4 and thence to position C which actuates the shifting fork 64 to engage gear 25 with countershaft 4 whereby rotation of the countershaft from drive shaft 1 via gears 15 and 25 takes place. The ratio of gears 15 and 25 is selected so as to produce a reduced speed having heavy drive torque at the vehicle wheels.

It will be apparent that the lever 30 can be operative in an H-pattern in the lower plane, in fact, a double H-pattern taking the reverse and crawl speeds into account. Also that upon being bodily lifted to the upper plane, H-pattern movement is again realized. It will be noted that the perpendicular distance from L to L2 is selected so that bodily upward lifting of lever 30 rotates shaft 41 to actuate valve 81 thereby reversing cylinder 68, and since this motion has the horizontal component $L_1$–L, it also reverses (via valve 71) the cylinder 66.

It will be noted that cylinder 66 can be shifted when lever 30 is in either plane and is automatically shifted when lever 30 is moved from one plane to the other. However, cylinder 68 is shifted automatically only and this occurs when lever 30 is bodily moved in the path L1–L2, L2–L1, or L2–L.

The gearing ratios are, of course, a matter of choice. However, a particularly advantageous combination of ratios in order to effect fairly equal vehicle velocity speed increments is to provide for the ratio of Group G to be a whole step larger than the entire ratio of Groups A and B.

Thus, the ratios preferred of the pairs of spur gears are:

*In the main gearing*

| | |
|---|---|
| Group R: 16/26 | 1.59 |
| Group C: 15/25 | 1.77 |
| Group A: 10/20 | 1.20 |
| 11/21 | 0.87 |
| 21/11 | 1.20 |
| Group B: 22/12 | 2.14 |

*In the auxiliary gearing*

| | |
|---|---|
| 13/23: 1.56 | 3.45 |
| 24/14: 2.21 | |

With the above ratios of the pairs of spur gears can be effected following speed ranges of the transmission:

| Speed range | R | C | A First | A Second | B | G First | G Second | Ratio of transmission |
|---|---|---|---|---|---|---|---|---|
| C | | 1.77 | | | 2.14 | 1.56 | 2.21 | =13.10 |
| I | | | 1.20 | | 2.14 | 1.56 | 2.21 | =8.86 |
| II | | | | 0.87 | 2.14 | 1.56 | 2.21 | =6.42 |
| III | | | 1.20 | 1.15 | | 1.56 | 2.21 | =4.76 |
| IV | | | | | | 1.56 | 2.21 | =3.45 |
| V | | | 1.20 | | 2.14 | | | =2.57 |
| VI | | | | 0.87 | 2.14 | | | =1.86 |
| VII | | | 1.20 | 1.15 | | | | =1.38 |
| VIII | | | | | | | | =1.00 |
| R | 1.59 | | | | 2.14 | 1.56 | 2.21 | =11.80 |

It will be understood that although pressure cylinders are utilized, other servomotor means, such as solenoids or electric motors, could also be used.

It will be further understood that a suitable slotted guide plate may be provided for the shift lever in moving between various positions and that a suitable locking device is provided to maintain the mechanism of FIG. 1 in elevated position for speeds V–VIII. The lever can also be provided with a collar that rides on guide bars for maintaining the higher position, such expedients being a matter of routine engineering and design.

What is claimed is:

1. A multi-speed transmission mechanism utilizing conventional spur gearing with a manual shift control mechanism for effecting speed changes by manual motions utilizing the familiar H-pattern shift lever movement; including (a) a main gearing and an auxiliary gearing;
   (b) said main gear having a drive shaft (1), an intermediate shaft (2) axially aligned to said drive shaft, and a first countershaft (4);
   (c) a first gear group (A) having a first gear (10) rotatably disposed on said drive shaft, a second gear (11) rotatably disposed on said intermediate shaft;
   (d) a first clutch (6), axially movable, but rotatably connected with said drive shaft and arranged between said first gear and said second gear, of which the first being in constant mesh with a gear (20) and the second with a gear (21), last-named gears being keyed on said first countershaft;
   (e) a second gear group (B) consisting of a gear (12) rotatably disposed on said intermediate shaft and being in constant mesh with a gear (22) keyed on said first countershaft;
   (f) and a second clutch (7), axially movable, but rotatably connected with said intermediate shaft and adapted for selectively providing a driving connection between either said second gear of the first gear group or said gear of said second gear group and said intermediate shaft;
   (g) said auxiliary gearing (G) having a driven shaft (3) axially aligned to said intermediate shaft, a second countershaft (5), a first gear (13) rotatably disposed on said intermediate shaft and being in constant mesh with a gear (23) keyed on said second countershaft, a second gear (14) keyed on said driven shaft and being in constant mesh with a gear (24) keyed on said second countershaft;
   (h) a third clutch (8) axially movable, but rotatably connected with said intermediate shaft and adapted for selectively providing a driving connection either between said first gear and said intermediate shaft for a reduced speed drive or between said intermediate shaft and said driven shaft for direct drive;
   (i) a movable shift lever (30) and actuating means (33, 34, etc.) operatively connecting said shift lever to manually power said first clutch (6) for said selective engagement thereof;
   (j) fluid power means comprising a fluid pressure cylinder (66) operatively connected to actuate said second clutch (7) for said selective engagement thereof;
   (k) and control means (71, etc.) connected for actuation by said shift lever (30) for controlling fluid pressure to said cylinder (66) for effecting actuation of said second clutch (7) responsive to predetermined actuation of said shift lever;
   (l) mounting means (31, 32, etc.) for said shift lever (30) for effecting movement in two directions, said actuating means (33, 34, etc.) being motivated by shift lever movement in one direction and said fluid power means being controlled by movement of said shift lever in another direction.
   (m) fluid power means (68) for actuating said third clutch;
   (n) control means (81, etc.) intermediate said latter fluid power means and said shift lever for selective actuation of said third clutch responsive to predetermined actuation of said shift lever.

2. In a multi-speed transmission as set forth in claim 1, said control means for said second clutch (7) comprising;
   (o) a first valve (71);
   (p) and said control means for said third clutch (8) comprising a second valve (81);
   (q) mounting and support means for said shift lever (30) whereby said shift lever is reversibly rockable in two planes and wherein said shift lever is bodily movable from one plane to another;
   (r) and respective means intermediate said shift lever and said valves so as to actuate said valves when said shift lever is thus bodily moved for effecting actuation of said clutches by means of said pressure cylinders.

3. In a multi-speed transmission as set forth in claim 2, said means intermediate said shift lever (30) and one of said valves (81) comprising;
   (s) a device (40, etc.) for restraining movement of said one valve (81) except when said shift lever is bodily moved between said planes.

4. In a multi-speed gear transmission, a main transmission means comprising a pair of (A, B) gear groups having speed ratio relationships in each said group, respective clutch means (6, 7) for selectively engaging gears of each group, shaft means (1, 2) to which gears of each group may be selectively engaged by said clutch means to effect a progression of drive ratios, a manually operable shift lever (30), means connecting said shift lever to actuate the clutch means (6) for effecting selective gear combinations wherein speed change is effected by manual force for one of said groups; pressure cylinder means (66) for actuating the clutch means of the other of said groups, and control means (71, etc.) intermediate said shift lever and said pressure cylinder means for effecting control of pressure thereto responsive to manual operation of said shift lever, an auxiilary transmission gear group (G) having a predetermined drive ratio, a respective clutch means (8) therefor for effecting a combination of drive speeds therewith said main transmission means (A, B) and a pressure cylinder means (68) for actuation of said latter clutch means (8), and control means (81, etc.) intermediate said shift lever and said latter pressure cylinder means for effecting control of pressure thereto responsive to manual operation of said shift lever.

5. In a multi-speed transmission as set forth in claim 4, said shaft means comprising an input shaft (1) and an intermediate shaft (2), and a reversing transmission group of gears (R) comprising a gear (16) on said input shaft and a crawl speed gear group (C) comprising a gear (15) on said input shaft, said latter named gears being disposed forwardly on said input shaft with respect to said main transmission gear groups (A, B).

6. In a multi-speed transmission as set forth in claim 4, including a countershaft (4) and a reverse speed gear group (R) and a crawl speed gear group (C), each said latter groups comprising a respective gear (25, 26) on said countershaft and relatively rotative with respect thereto, a clutch means (9) selectively operable to engage either of said respective gears with said countershaft, said countershaft extending into connection with said main transmission gear groups (A, B) for effecting crawl and reverse speeds in combination therewith.

7. In a multi-speed transmission, a plurality of gears to be selectively combined for effecting selective drive speeds, and a plurality of clutch means selectively operable for effecting predetermined combinations of said gears, means for actuating said clutch means comprising a shift lever, mounting and support means for said shift lever permitting movement transversely of its axis in either of two generally parallel planes, said shift lever being bodily movable for subsequent transverse movement in either plane.

8. In a multi-speed transmission as set forth in claim 7, said shift lever being movable in an H-pattern in either plane.

9. In a multi-speed transmission as set forth in claim 7, including servomotor means connected for actuating said clutch means, and control means intermediate said shift lever and said servomotor means, said control means being connected to said shift lever whereby movement of said shift lever from one plane to another actuates said control means to effect actuation of said clutch means.

References Cited

UNITED STATES PATENTS

| | | | |
|---|---|---|---|
| 3,052,102 | 9/1962 | Alfieri | 74—335 |
| 3,061,058 | 10/1962 | Barth | 74—745 |
| 3,282,122 | 11/1966 | Magg et al. | 74—473 |

FRED C. MATTERN, JR., *Primary Examiner.*

H. S. LAYTON, *Assistant Examiner.*